UNITED STATES PATENT OFFICE.

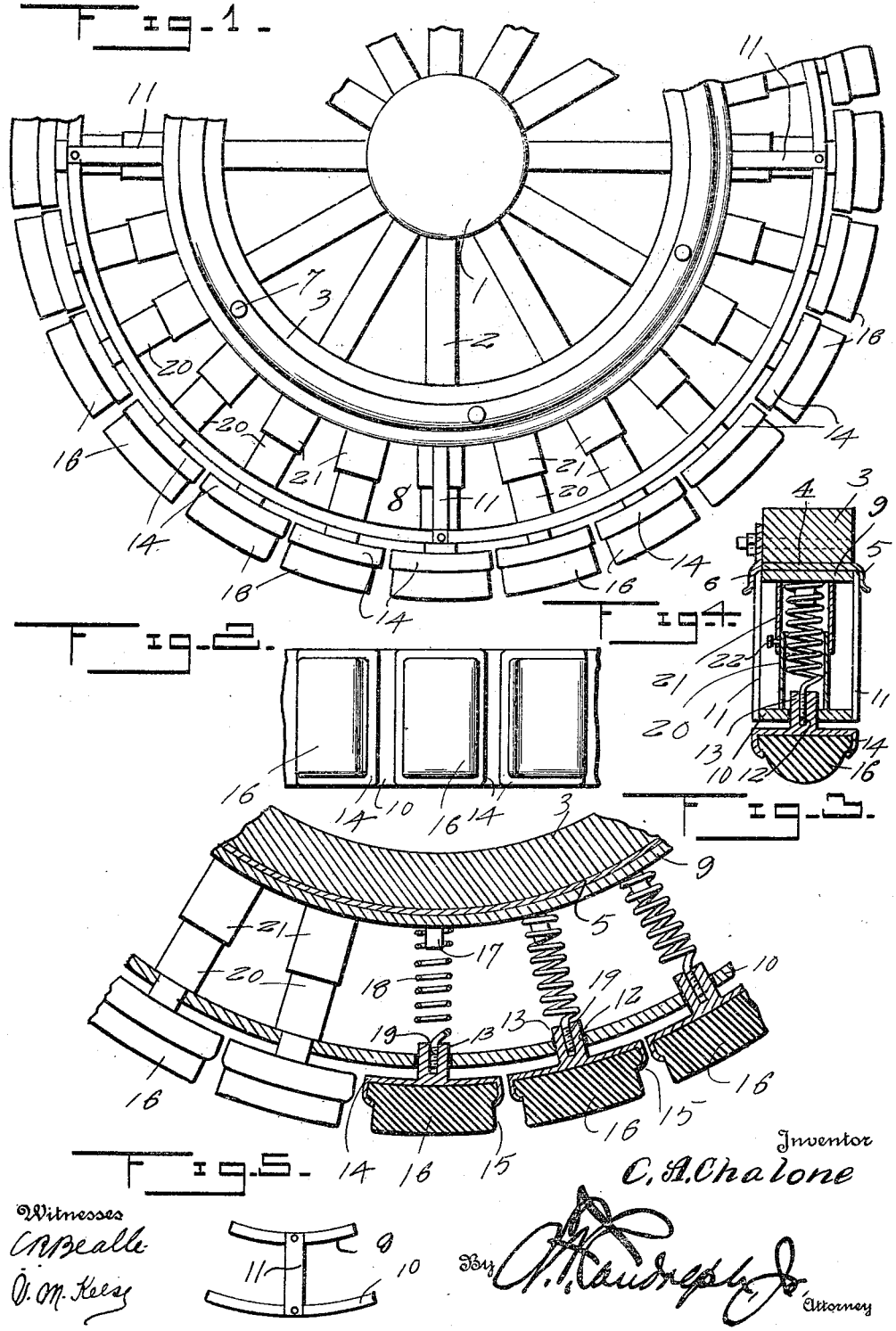

CHARLES A. CHALONE, OF ABERDEEN, MARYLAND.

SPRING-TIRE.

1,272,215.

Specification of Letters Patent.

Patented July 9, 1918.

Application filed April 12, 1918. Serial No. 228,196.

*To all whom it may concern:*

Be it known that I, CHARLES A. CHALONE, a citizen of the United States, residing at Aberdeen, in the county of Harford and State of Maryland, have invented certain new and useful Improvements in Spring-Tires; and I do hereby declare the following to be a full, clear, and exact description of the invention, such as will enable others skilled in the art to which it appertains to make and use the same.

This invention relates to improvements in spring tires and has for one of its objects the provision of a device of this character whereby sufficient resiliency will be furnished by the material of the tire when passing over a comparatively even surface and which tire is capable of moving inwardly under tension means when engaging obstructions such as ruts or stones on the surface of the roadway so that the shocks and jars are absorbed thereby.

Another object of this invention is the provision of a rim construction removably secured to the felly of a wheel and having tire supporting means carrying tire sections and cushionly supported so that they may move inwardly when the tire sections engage obstructions thereby absorbing the shocks and jars to the wheels.

A further object of this invention is the provision of a spring tire of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:

Figure 1 is a front elevation of a spring tire constructed in accordance with my invention, Fig. 2 is a fragmentary plan view illustrating the sectional tire, Fig. 3 is a fragmentary vertical sectional view illustrating the manner of cushionly supporting the tire supporting means.

Fig. 4 is a fragmentary transverse sectional view illustrating the manner of securing the rim structure to the felly of the wheel, and Fig. 5 is a fragmentary plan view illustrating the means of connecting the inner and outer rims.

Referring in detail to the drawing, the numeral 1 indicates a hub having secured thereto radial spokes 2 on which is mounted the felly 3. The felly 3 carries a rim 4 having formed upon one edge a retaining flange 5 and has its other edge coöperating with a removable flange 6. The removable flange 6 is secured to the felly 3 by means of bolts 7. The aforedescribed construction relates to a well known type of wheel and to which my invention is applied.

A rim construction 8 consists of inner and outer rims 9 and 10 which are secured together by bars or members 11. The bars or members 11 are seated within recesses formed within the rims 9 and 10 for preventing the rims from having relative movement in relation to each other when the bars or members are secured in place. The inner rim 9 is positioned upon the rim 4 and held thereon by the removable flange 6 as illustrated in Fig. 4. The outer rim 10 is provided with a plurality of spaced rectangular openings 12 to slidably receive stems 13 formed upon the tread supporting members 14. The tread supporting members 14 have formed thereon tread engaging flanges 15 which secure thereto tread sections 16 constructed of rubber or any other material suitable for the purpose. The tread sections 16 are located in close relation to each other so as to form a substantially continuous tread to the device but are spaced sufficiently to permit the members 14 to move inwardly when their respective tread sections 16 engage an obstruction.

Lugs 17 are formed upon the outer face of the inner rim 9 and arranged in spaced relation and in alinement with the rectangular openings 12 and have secured thereto the inner ends of coil springs 18. The outer ends of the coil springs have formed thereon screw threaded extensions 19 that are threaded into the stems 13 to establish a connection between the springs and the tread sections. The springs are of such a strength that they normally support the members 14 in spaced relation to the outer rim 10 when under the normal weight of the automobile or vehicle and the occupants thereof but which permit the members 14 and tread sections 16 to move inwardly when engaging an obstruction to absorb the shocks and jars therefrom.

A protector 20 surrounds or is mounted upon each of the springs 18 and is interposed between the inner and outer rims 9 and 10 and each consists of telescopic sections 21 that are adjustably connected together by set screws 22. By having the protectors 20 constructed of telescopic sections 21 provides a construction wherein one section may be moved in relation to the other section by releasing the set screw, so that the springs can be examined.

While I have shown and described the preferred embodiment of my invention, it will be understood that minor changes in construction, combination, and arrangement of parts may be made without departing from the spirit and scope of the invention as claimed.

What I claim as new is:—

1. A spring tire comprising inner and outer rims, members securing said rims in spaced relation, means securing the inner rim to the felly of a wheel, said outer rim having rectangular openings, rectangular stems slidable in said openings, tread supporting members formed upon said stems, tread sections secured to said supporting members, lugs formed upon the inner rim, springs having their outer ends threaded into the stems and their inner ends secured to the lugs, and protectors surrounding said springs and interposed between the rims.

2. A spring tire comprising inner and outer rims, means securing said rims together, means securing the inner rim to the felly of a wheel, stems slidable in the outer rim, tread supporting members formed on said stems and spaced from the outer rim, tread sections secured to said supporting members, springs secured to said stems and to the inner rim, and telescopic protectors surrounding said springs and interposed between the inner and outer rims.

In testimony whereof I affix my signature in presence of two witnesses.

CHARLES A. CHALONE.

Witnesses:
THOMAS C. HOPKINS,
EDWIN C. KIRKWOOD.

Copies of this patent may be obtained for five cents each, by addressing the "Commissioner of Patents, Washington, D. C."